United States Patent [19]
Riddle, Jr.

[11] Patent Number: 5,327,633
[45] Date of Patent: Jul. 12, 1994

[54] METHOD OF REPAIRING VEHICLE SUN VISORS

[76] Inventor: Johnie B. Riddle, Jr., 251 Springbrook Dr., Mansfield, Tex. 76063

[21] Appl. No.: 769,092

[22] Filed: Sep. 30, 1991

[51] Int. Cl.⁵ .............................................. B23P 6/00
[52] U.S. Cl. ........................... 29/402.08; 29/402.09; 29/402.11
[58] Field of Search ............... 29/91.1, 402.01, 402.03, 29/402.08, 402.09, 402.11, 402.12, 402.14, 463; 296/97.1

[56] References Cited

U.S. PATENT DOCUMENTS

| | | |
|---|---|---|
| 3,405,969 | 10/1968 | Creel . |
| 3,433,525 | 3/1969 | Augunas . |
| 3,610,680 | 10/1971 | Brady . |
| 3,716,269 | 2/1973 | Herr et al. . |
| 4,068,428 | 1/1978 | Peterson, III ........................ 29/448 |
| 4,353,593 | 10/1982 | Henson ............................ 296/97.1 |
| 4,465,534 | 8/1984 | Zelkowitz ............................ 156/91 |
| 4,763,946 | 8/1988 | Robbins et al. . |
| 4,858,983 | 8/1989 | White et al. . |
| 4,921,273 | 5/1990 | Weightman et al. ............... 297/482 |
| 4,944,971 | 7/1990 | McLaughlin . |
| 4,952,008 | 8/1990 | Lobanoff et al. ..................... 29/91.1 |
| 4,982,991 | 1/1991 | Lawassani et al. . |
| 4,998,767 | 3/1991 | Lawassani et al. . |
| 5,007,532 | 4/1991 | Binish . |
| 5,031,950 | 7/1991 | Miller . |
| 5,031,951 | 7/1991 | Binish . |
| 5,094,015 | 3/1992 | Griffith ............................ 29/402.11 |

FOREIGN PATENT DOCUMENTS 289473  11/1988  European Pat. Off. ............ 296/97.1

Primary Examiner—Mark Rosenbaum
Assistant Examiner—David P. Bryant
Attorney, Agent, or Firm—Charles W. McHugh

[57] ABSTRACT

A method for restoring worn or damaged sun visors for a vehicle to a like-new appearance typical of original sun visors. Any deteriorated upholstery and padding material that covers the core/frame of an original sun visor may be removed and discarded. A new cover is fabricated with an appropriate size to slip over the old visor. The cover is made by sewing together front and rear panels along about 50 percent of their juxtaposed edges. Each panel is shaped like the original core, and has a structural base made of a thin sheet of chipboard or the like; each panel is sufficiently stiff as to be self-supporting. Each panel is cosmetically completed by providing it with an outer covering of finished upholstery material or the like. The slip cover may be placed about a visor core, or about an entire visor, to provide a new outer surface. Once the new slip cover has been slipped over the visor core, the confronting edges along that part of the cover that is still open are then secured to one another, preferably with a fastener like Velcro. This permits the new slip cover to be removed at a later time, if desired, for cleaning, etc. The visor core or old visor may be enveloped with the new slip cover while the structural core is still affixed to a vehicle, or the visor may be removed—and the repair work done on a workbench.

11 Claims, 2 Drawing Sheets

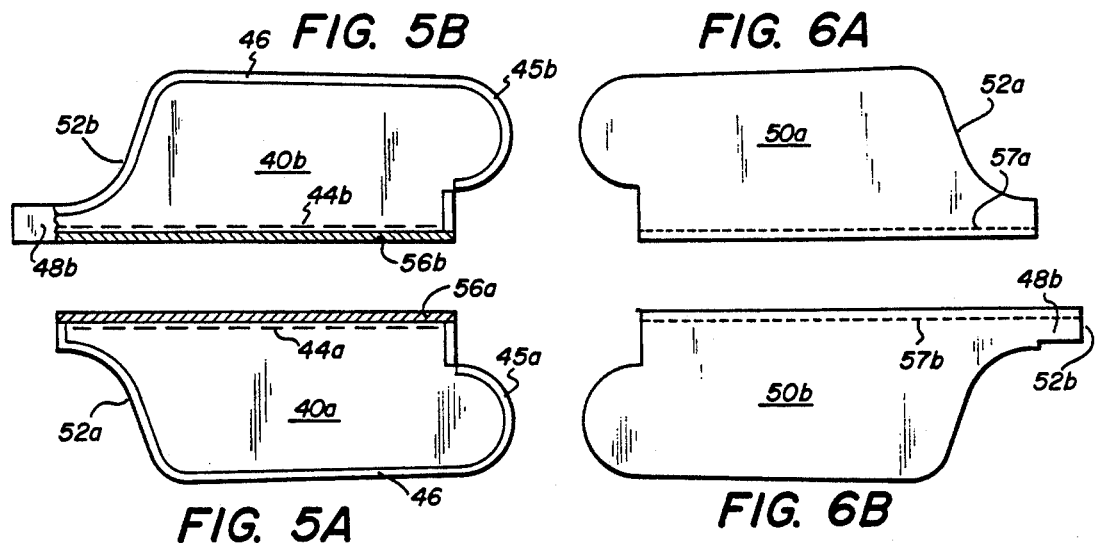
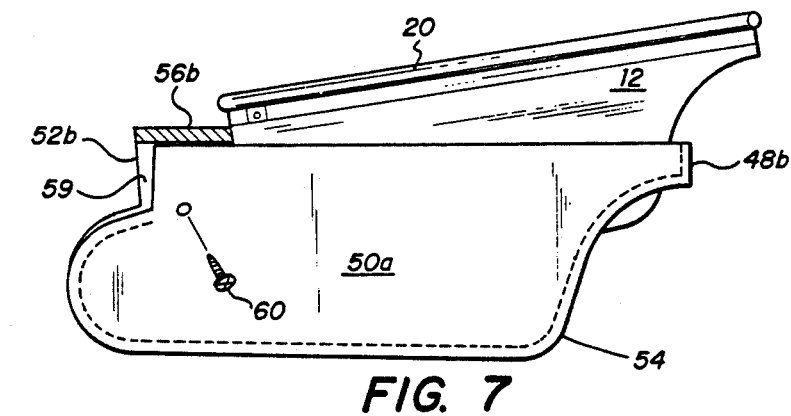
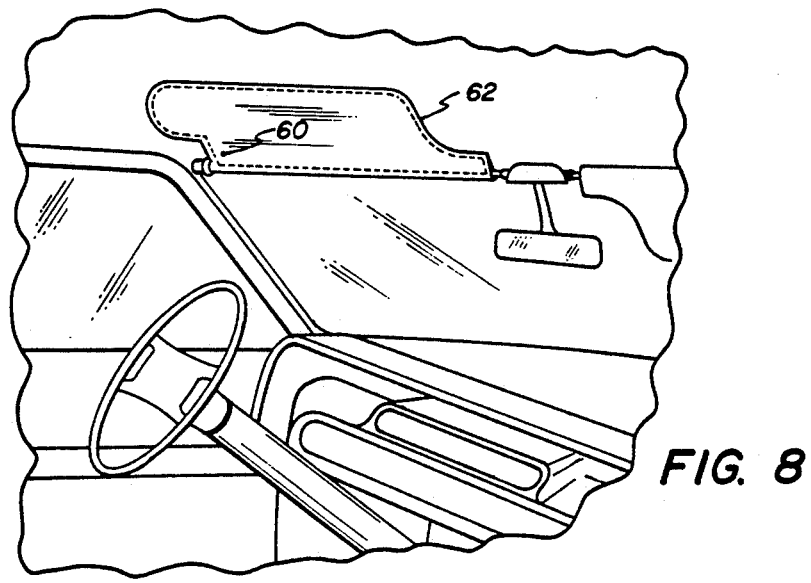

METHOD OF REPAIRING VEHICLE SUN VISORS

BACKGROUND OF THE INVENTION

This invention relates generally to vehicular visors of the type that are commonly used in automobiles, trucks, recreational vehicles and the like; more particularly, it relates to a method and an assembly for restoring original equipment sun visors to a like-new appearance.

Most large vehicles for carrying passengers (including automobiles, buses, trucks, recreational vehicles, etc.) are equipped with sun visors that are mounted above the vehicle's windshield and along that portion of the body header adjacent the upper edge of the windshield. Because all such sun visors (also known as sun shades) are essentially the same in function, if not in length or width, they will be referred to herein as if they were designed for use on automobiles. Such visors are usually connected to the body header near the windshield pillar by use of a mounting bracket and hinge assembly. This arrangement enables rotational movement (about an essentially vertical axis) and translational adjustment of the visor (about a horizontal axis). Other construction features, common to a wide variety of visors, include application of an attractive outer fabric, or other finish material, over a firm core. The core often includes a wooden or plastic foundation and resilient foam or other padding.

Despite their simple mechanical operation and the minimal functional requirements which they are designed to meet, the designs and shapes of sun visors are diverse. In part, this is attributable to the many variations in vehicle body style. For example, it is well known that when the visor is moved into a storage position against the header, the visor shape must conform with a curvature that is specific to a particular header structure. Thus, many visors include flexible flaps or hinged end portions. Examples of such are illustrated in U.S. Pat. Nos. 3,610,680 and 5,031,951. Moreover, visor geometries are somewhat dependent on the sizes and shapes of windshields and adjoining side windows. They may also be "optimized" for a particular vehicle to best accommodate drivers of various heights, in order to protect the maximum possible number of people from sunlight and glare.

Because they are subject to both manual handling and the direct rays of the sun, visors frequently deteriorate in appearance after they have been subjected to a harsh environment for a period of years. In fact, many visors deteriorate to the point that they are very unattractive; and because they are so prominently visible in front of a driver's or passenger's eyes, they often need to be replaced before the rest of the vehicle has deteriorated to the point of justifying a final trip to a dumping yard. With original equipment manufactures (often abbreviated as O.E.M.) often having to redesign sun visors every time that body styles change, the limited market demand for each style, size and color simply has not supported an after-market source for replacement visors. In fact, because visor fabrics are normally coordinated with the upholstery of each vehicle, custom work has nearly always been required in order to replace or restore a worn visor.

As is typical for articles of mass manufacture, original equipment visors are assembled in programmed manufacturing operations that incorporate customized equipment. Such programmed operations routinely provide a high quality, uniform appearance. For example, when the finish material is applied over the visor core, tension is applied in a predetermined manner to prevent pull out and "bagging" of the material during or after assembly. When the final seam is sewn along the visor edge, the stitching that is visible through the relatively thick visor material appears uniform and evenly spaced from each edge. Generally, original equipment manufacturers are quite successful at providing fast, low cost manufacture of visor products; and their products (which are produced with the use of jigs, fixtures, precision cut pieces of material, etc.) can be expected to retain a neat appearance for many months.

In contrast, when visor repair becomes necessary, the process of restoring a visor to a high quality, uniform appearance is typically a very labor-intensive activity in which a trained and experienced individual must try to duplicate the appearance of assembly line products. Indeed, the expense of repairing or restoring most any visor to an appearance similar to that of the original product is primarily attributable to the labor and skill that is involved in trying to duplicate the quality of original manufacture.

Visor restoration frequently calls for replacement of deteriorated foam padding as well as the outer fabric. Although these materials are normally available and of reasonable cost, the added effort to replace the pad may require efforts at duplicating original manufacturing steps but without customized or heavy duty equipment. For example, in a visor having a flexible flap, a relatively hard visor core may need to be replaced or supplemented before any new foam can be added. In order to ensure that the new visor flap will fit the header curvature and operate in a hinge-like manner, careful alignment and stitching along or through a hard core may be required.

For reasons noted above, after-market visor replacements have not been available on a "universal" basis. But there have been limited efforts to develop some special techniques for visor restoration. See, for example, U.S. Pat. No. 4,944,971 to McLaughlin which describes a plastic-like, or rubberized, slip cover for placement over a sun visor. Portions of the cover are heat shrinkable over a stable core; however, such efforts are not directed toward restoring a visor to the appearance that is typical of a carefully upholstered piece of furniture. Nor has there been made available a simple, efficient means for restoring any of the desirable features associated with certain visor components, e.g., a well-padded appearance. Nor has there been available a simple technique for creating a flexible flap which operates in the same controlled manner as the original visor flap. It is therefore desirable to have a time-saving process which provides quality restoration for a wide variety of sun visors.

BRIEF SUMMARY OF THE INVENTION

To help satisfy the long-standing needs described above, a method is now provided for restoring worn sun visors to a like-new appearance typical of original sun visors. The method provides for the removal and discarding of any deteriorated upholstery and padding material that covers a core, and the substitution of new material that takes its shape from a new and thin structural support that fits over the core or visor frame. The method also provides for the restoration of proper visor operation even when the visor frame has been significantly damaged.

Generally, a method for restoring a typical visor involves the preparation of a front replacement panel, said panel having a thin base of chipboard or the like— which is sufficiently stiff as to be self-supporting. The panel has an outer covering of finished upholstery material, and has a shape generally the same as that of the visor's core. A rear replacement panel is also prepared; it too has a thin base of chipboard or the like, and it has an outer covering of finished upholstery material. The new rear panel has a shape which is the mirror image of the front panel. The two thin panels are placed against one another with their corresponding edges juxtaposed and with the outer surface coverings facing away from one another. The matched edges along each panel are joined together along most of their length, to form an envelope-like slip cover having an opening of sufficient size for receiving the visor core. The slip cover may be placed about a visor core, or about an entire visor, to provide a new outer surface over an older surface. Once the new slip cover completely envelops the visor core, part or all of those panel edges along the opening are affixed to one another so as to completely enclose the visor core or old visor.

In a preferred embodiment the base (or backing) for each of the two panels is formed with a paper product such as chipboard having a thickness of about 0.030 to 0.080 inch, so that it can be readily cut with heavy-duty scissors and shaped by hand (if necessary). The panel opening which is deliberately created for the purpose of receiving the visor core is eventually closed by joining one panel edge to another, preferably with a hook and loop fastening assembly of the kind widely sold under the trademark "VELCRO". Such a fastening assembly permits the new slip cover to be removed at a later time, if desired, for cleaning, etc. The other edges of the panel are permanently joined by stitching or bonding.

The concept of forming a decorative visor cover in an open envelope configuration having the shape of a visor core is, of course, a desire in the art of original equipment manufacture. Such an arrangement enables separate assembly of the cover and provides a neat, clean appearance along the seam. See, for example, U.S. Pat. No. 4,982,991 to Lawassani et al.; and U.S. Pat. No. 3,716,269 to Herr et al. Also, U.S. Pat. No. 4,998,767 to Lawassani et al., discloses an envelope configuration which overcomes the less attractive appearance of a clamshell design wherein the finish material is clamped between two halves of a visor core.

Techniques as disclosed by Lawassani et al. require a specialized clamshell core with an integral clamping mechanism to capture material along the envelope opening. Otherwise, there would be a need to close the envelope opening with a stitch or adhesive after the core is inserted. For this reason, the ideas disclosed by Lawassani et al., while readily implemented in the context of large scale equipment production, are limited in application to such specialized manufacture; and mass-production techniques for an O.E.M. supplier are not appropriate for trying to restore an individual sun visor to its original appearance.

BRIEF DESCRIPTION OF THE FIGURES OF THE DRAWING

FIGS. 5a and 5b illustrate edges of the finish material wrapped over the edges of the backing material and bonded thereto;

FIGS. 6a and 6b illustrate a pair of panels formed from the backing members and finish material;

FIG. 7 illustrates the panels of FIG. 6 joined in an envelope configuration to receive a visor core; and FIG. 8 illustrates a completely remanufactured sun visor according to the invention, installed in a vehicle.

DETAILED DESCRIPTION OF A PREFERRED EMBODIMENT OF THE INVENTION

Figure 1:
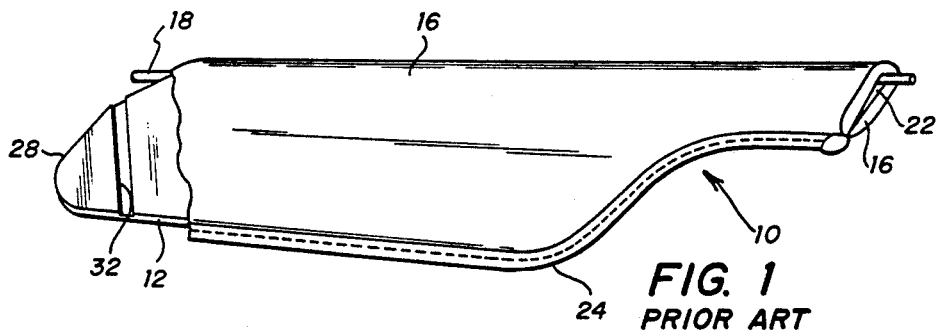
FIG. 1 provides a partially broken-away perspective view of an exemplary original equipment sun visor.
Figure 2:
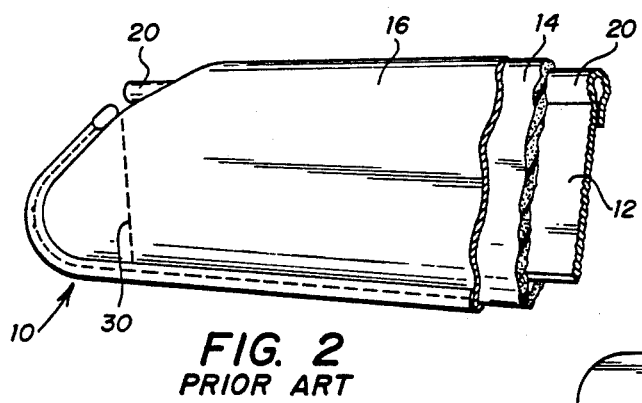
FIG. 2 is a second partially broken-away perspective view further illustrating composition of the original equipment sun visor.

FIGS. 1 and 2 illustrate in perspective view a automotive vehicle sun visor 10 of a variety that was common on several new U.S. vehicles during the 1970's. This particular design incorporates design and manufacturing features which have made it difficult for skilled craftsmen to restore a worn visor to the appearance of an original product. The visor 10 includes a core 12 formed with hard board material which is covered with padding 14; the padding is, in turn, covered with an attractive finish material 16 (usually cloth) whose color has been selected to coordinate with the decor of the vehicle's interior.

A support rod 18 is secured along the upper edge of the core 12 through a stamped metal hinge 20. At its proximal end, the rod 18 is pivotally connected to the body header through a mounting bracket (not illustrated). With this arrangement a vehicle occupant can rotate the visor about the hinge 20 from a raised, storage position against the body header to a low, sun-blocking position. Also, pivotal movement about the mounting bracket allows for swinging the visor from a position adjacent the upper windshield edge to the side window of the vehicle.

A step in the original fabrication process for a visor 10 is the folding of the padding 14 and finish material 16 about the core 12 and hinge 20. Open ends of the folded materials meet below the lower edge of the core 12. As illustrated, these ends are stitched together, beginning at a point below one end of the hinge 20 and extending to a point below the other end of the hinge 20. The resulting seam is spaced from the hinge ends to leave openings 22 in order for the support rod to pass through the visor 10. To provide a neat appearance to the finished product, a flap of excess material (not shown) is often tucked into each opening and the stitch is sewn through a bead 24.

Alternately, each end of the finish material 16 could be folded at the lower edge of the core 12, so that excess material 16 is tucked between an adjoining layer of padding 14 and the core 12. With this arrangement the stitch can be sewn without the bead 24 and still provide an attractive appearance.

In order that the visor shape will conform with any curvature along the header structure, a somewhat flexible member 28 can be formed in the core 12 by adding a stitch 30 through the finish material 16 and padding 14. The stitch passes through the core 12 at a thin (and hence weakened) portion between the member 28 and the remainder of the core 12. The weakened portion 32 may be broken after the padding 14 and cover 16 have been applied, creating what amounts to a hinge-like axis for bending of the member 28 with respect to the core. In some cases the member 28 may be completely severed from the rest of the core 12 when the "hinge" is formed.

When attempting to restore the visor 10 it has been common to try to install replacement material in a manner similar to or identical to the original manufacturing process. As noted earlier, absent specialized equipment this cannot be completed as efficiently as when finished during original manufacture. According to the invention, restoration can be performed in a manner significantly different from, but compatible with, the original fabrication process—to provide a "look-alike" product.

FIGS. 3-7 illustrate a remanufacturing process which utilizes the core of the original visor and provides a high quality "look-alike" product. This process is more efficient than restoration procedures which attempt to duplicate steps of the original manufacturing process.

Figure 3:
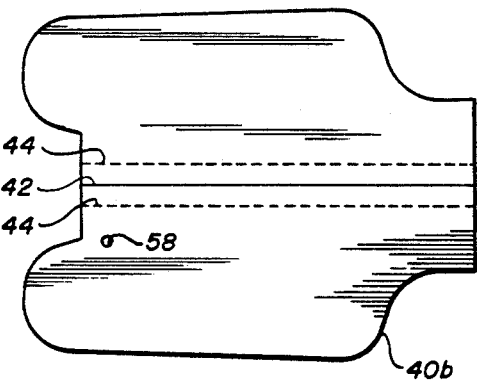
FIG. 3 illustrates forward and rear backing members of the invention.

According to the process, complementary forward and rear backing members 40a and 40b are prepared by a die cut or stamping procedure, preferably from a sheet of common chipboard. Chipboard is a cellulose-based material similar in some respects to the face sheets of common corrugated cardboard; it is also used sometimes as the structural backing for pads of writing paper, e.g., legal pads and the like. Generally, the size and shape of each die cut corresponds to the pattern of the visor to be refurbished. FIG. 3 illustrates the forward face of member 40a and the rear face of member 40b as they are initially cut from the chipboard. The forward face of member 40a corresponds to the side of the finished visor which faces the window when the visor is positioned to block sunlight. The rear face of member 40b corresponds to the side of the finished visor which faces the body header after the visor has been rotated to a storage position.

When being cut from a large sheet of common chipboard, the members 40a and 40b are separated along the solid "cut line" 42 of FIG. 3. The cutting process also imparts a pair of perforated, i.e., intermittently cut, fold lines 44 along either side of the cut line 42. Thus, each fold line will be along an edge of a different one of the members 40a, 40b. After the members 40a, 40b are cut, creases are made along the designated fold lines 44. Thus, two creases will be present adjacent the edge of the visor 10 along which the hinge 20 is rotatable.

Next, very thin padding and new finish material are prepared, and they are sized larger than the members 40a, 40b so that they will extend one-half inch or so beyond the boundaries of the backing members. For efficiency, the new padding and decorative materials are performed as a composite structure, wherein a thin layer of foam backing is bonded to the underside of a decorative material. Foam-backed decorative materials which are commonly used in vehicle headliners may be used for this purpose. Finish sheets 45a and 45b are cut from such decorative material, and bonded to the members 40a-40b with glue or the like, to create self-supporting panels. Sheet 45a corresponds in shape to the forward face of member 40a; and sheet 45b corresponds in shape to the rear face of member 40b.

Figure 4B:
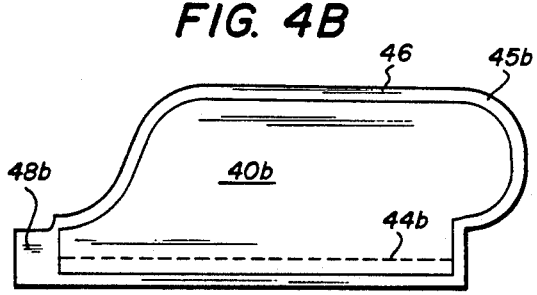
FIGS. 4a and 4b illustrate application of finish material to the forward and rear backing members of FIG. 3.
Figure 4A:
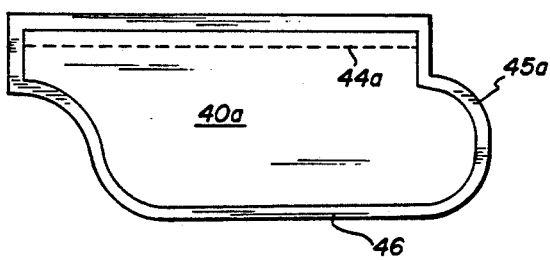

FIGS. 4a and 4b, respectively, provide views of what will become the inner or back sides of the visor cover, i.e., the sides that are opposite the forward face of member 40a and the rear face of the member 40b. These inner sides will not be seen when the visor is completed, but they illustrate placement of the members 40a, 40b over the foam backing of the sheets 45a, 45b. Edge portions 46 of the sheets 45a, 45b extend approximately one half to one inch beyond the edges of the members 40a, 40b. In addition, sheet 45b includes an extended tab section 48b.

The foam backing of each sheet 45a, 45b is bonded in approximate symmetric alignment with either the forward face of member 40a or the rear face of member 40b. When completing the joinder of the sheets 45a, 45b to the members 40a, 40b, all of the edge portions 46 (except for the tab section 48b) are folded over the edges of the members 40a, 40b and are bonded to the reverse sides of the chipboard members. This folded-over condition is shown in FIGS. 5a and 5b.

Bonding is accomplished by applying any of several well known adhesives to the forward and rear faces of the chipboard members 40a, 40b; and then the foam backing is placed in contact with the adhesive. Alternatively, the adhesive is placed on the foam backing, and then the members 40a, 40b are laid on the adhesive. Generally, the adhesive should be capable of withstanding relatively high temperatures, e.g., up to 220 degrees Fahrenheit, which may be encountered in the interior of a closed vehicle. Of course, this will be apparent to those skilled in the art.

After bonding has been completed, the decorative side of the sheet 45a completely overlays the forward face of the member 40a, and becomes an exterior side 50a of a front visor replacement panel 52a. Side 50a faces the window when the visor is positioned to block sunlight. Similarly, the decorative side of the sheet 45b completely overlays the rear face of the member 40b, and becomes an exterior side 50b of a rear or back visor replacement panel 52b. Side 50b faces the body header when the visor is rotated to a storage position. The front and rear panels 52a, 52b have matching shapes that are essentially mirror images of one another, and correspond to different sides of the visor core 12, as shown in FIGS. 6a and 6b. The panels 52a, 52b are slightly larger than the visor core which they are designed to fit over.

After the panels 52a and 52b have been prepared in such a way that decorative material now folds over those edges that will be readily seen by a vehicle passenger, the panels are joined with one another along the folded edge portions 46. The extent of this joining operation is to create an envelope or slip cover configuration. As joined, the assembly may now be conveniently referred to as slip cover 54; in this mode, the exterior sides 50a and 50b face away from one another so that the finish material faces outward.

A releasable fastening means is provided along the edge of each visor panel 52a, 52b, adjacent the fold line 44 that was created in the associated chipboard backing member, to effect mating engagement between the panels. Preferably, the releasable fastening means is a fastening assembly (indicated in FIGS. 5a, 5b) that is formed by stitching complementary hook 56a and loop 56b fastening material over the linear edge portion of each panel 52a, 52b. Such mechanically interlocking hook and loop fasteners are widely sold under the trademark "VELCRO". Hook and loop fasteners are routinely sold with an adhesive already applied to the back sides of the respective pieces. But it is useful to ensure a dependable anchoring of the fasteners by also providing a row of stitches 57a and 57b, as shown in FIGS. 6a and 6b. This releasable fastening means provides what amounts to a sealable opening, which completes the envelope configuration. Of course, a variety of alternate fasteners (e.g., snaps) could be employed, but hook/loop fasteners are preferred because of the professional appearance which they contribute to a finished product. And when someone spends many thousands of dollars for a vehicle, it is to be expected that the trim work will be accomplished in a manner that conceals the opening after restoration is completed.

As illustrated in FIG. 7, most of the matching edge portions along the panels 52a and 52b (i.e., more than 50 percent) are stitched together to provide the envelope shape. Although a decorative bead 24 (such as the bead illustrated in FIG. 1) may be incorporated with the stitch, this is likely to be done only for the purpose to replicate the original visor style. With the process disclosed herein, a bead is not necessary for the purpose of concealing unattractive edges. A neat, uniform appearance will result without the bead because the edge portions 46 of the finish material 16 are bonded to the backing members. After the slip cover 54 has been pushed over the original core of the visor, the remaining unstitched tab section 48b may then be tucked into the slip cover 54 to close the last remaining opening into the now-covered visor.

Perhaps it should be mentioned at this point that the fastening assembly formed from mating elements 56a, 56b may be engaged and disengaged without the use of any tools. And when the hook/loop assembly 56a, 56b is "open," the slip cover 54 has an opening (along the chipboard fold lines 44) that is more than ample for receiving the visor core. Hence, there is no necessity to remove the original visor from a vehicle in order to repair it. This alone should save considerable time in the repair of visors. But it may be more convenient for a worker to remove a visor and take it to a workbench for repair. Either way, a worker need only insert the visor core 12 into the new slip cover 54 (as shown in FIG. 7) to have a neat, tight-fitting cover with no sags from loose material.

If the original visor has a clamping screw 60 which is secured as an integral part of the mounting process, as shown in FIG. 7, this can be readily accommodated. A small opening 58 can be cut in the rear backing member as shown in FIG. 3, or a hole can be punched through the panel 52b, after assembly of the slip cover 54.

In contrast to the cost of providing complete aftermarket replacement visors, the only specialized item required by this process is the pair of complementary backing members 40a, 40b. While these could be custom-made during the restoration process, it is preferred that the required backing members be prefabricated. For example, a single supplier could cut backing members for a wide variety of visors at very modest cost and make them available with instructions according to the above-described process. Alternately, templates, or other forms of patterns for cutting the backing members, could be made available so that the backing members are cut on an as-needed basis by the craftsman restoring the visors. For those who do not have access to the decorative materials to complement a vehicle's interior complete slip covers 54 can also be made and sold as completed units, so that do-it-yourselfers might buy visor covers at any convenient auto parts store.

FIG. 8 illustrates remanufactured visor 62, incorporating the slip cover 54, installed against the header structure of a vehicle. From a passenger's vantage point, the visor 62 looks essentially no different than an original equipment product. The stitching around the panel edge portions 46 appears neat and uniform. The "VELCRO" fastening assembly 56a, 56b along the upper edge of the core 12 eliminates the need for any stitching after the core (or entire worn visor) is inserted. By locating the slip cover opening 59 along the visor hinge, the final step in mounting a visor cover (connecting the elements 56a, 56b) results in effectively concealing the fastening assembly 56a, 56b adjacent the header structure. If the last opening to be closed were formed along the lower edge 22 of the core, then whatever fastening means was used would be plainly visible to vehicle occupants.

Another advantage of this remanufacturing process described herein is that the backing members 40a, 40b and the completed visor slip cover 54 can be sized large enough to fit over the old, worn materials. That is, either the core 12 or an entire worn visor can be received within a semi-rigid slip cover that is sized large enough. By covering the complete visor, the need to work directly with an old and crumbly core 12 is eliminated. In situations when the core includes a severed flexible member as shown in FIG. 1, the time otherwise required for handling and alignment of components can be reduced or eliminated. When the slip cover fits completely over the old, worn visor, it also replicates the appearance of an original equipment visor.

The above description is directed to restoration of a particular visor. However, the remanufacturing process is adaptable to a wide variety of visor designs incorporated in many different brands and styles of vehicles. By way of example, the visor could be of the clamshell style formed with a molded polymeric core, wherein the visor halves are either bonded to one another or snap together to clamp the edges of the finish material. Alternately, the visor could be formed with a cardboard butterfly inner support of the type filled with a rigid urethane foam to provide stiffening. The core could also be of the wire or plastic molded frame variety.

The replacement panels 52a, 52b could also be patterned to accommodate visor accessories such as a vanity mirror or a pocket for storing small items. In addition, the panels could be embossed, monogrammed, or otherwise detailed for a personalized appearance while retaining an original equipment appearance.

From the above description it can be seen that a substantially improved means has been provided for expeditiously restoring a worn or damaged sun visor in a professional manner which replicates the original visor appearance. Regardless of the condition of the inner core material, no structure, other than the replacement panels is needed to repair the visor. This is because the panels 52a, 52b while relatively thin and flexible, comprise a paper-derivative material which provides sufficient stiffness to make the panels self-supporting.

Many variations and modifications of the disclosed process will perhaps become apparent in view of the variety of visors in existence and the various forms of wear and deterioration they exhibit. Accordingly, it is to be understood that certain forms of the invention have been described and illustrated herein, but that the invention is only to be limited in scope by the claims which follow.

What is claimed is:

1. The method of repairing a damaged sun visor of the type that is provided as original equipment by manufacturers of vehicles including automobiles, trucks and recreational vehicles, said sun visor including a structural frame that defines the general shape of the sun visor and further including upholstery that covers the frame, said repairing of the damaged sun visor typically being made necessary as a result of deterioration of the upholstery that covers the frame, comprising the steps of:

a. preparing a front replacement panel for the sun visor, said front panel having a shape that is generally the same as that of the structural frame but being just slightly larger than said structural frame, said front panel being sufficiently stiff as to be essentially self-supporting, and said front panel having an outer surface that is at least as attractive as the sun visor's original upholstery;

b. preparing a back replacement panel for the sun visor, said back panel having a shape that forms essentially a mirror image of the front replacement panel, and said back panel being sufficiently stiff as to be essentially self-supporting, and said back panel having an outer surface that is at least as attractive as the sun visor's original upholstery;

c. positioning the front and back replacement panels together in such a way that their edges are juxtaposed, and the outer surfaces of the respective panels are facing away from one another;

d. affixing the front and back replacement panels to one another along about 50 percent of their juxtaposed edges so as to form a partial envelope that can be slipped over the structural frame while leaving the remainder of the juxtaposed edges loose and unattached;

e. sliding the affixed panels over the structural frame to the extent that the structural frame panel is completely enveloped; and f. affixing to one another at least most of the remaining loose and unattached edges of the front and back panels, whereby the structural frame will be captured by the front and back panels which are affixed over more than 50 percent of their juxtaposed edges.

2. The method as claimed in claim 1 wherein the front panel includes a piece of relatively stiff chipboard and a piece of upholstery that is initially larger than the chipboard, and the upholstery being wrapped around at least most of the chipboard edges in order that edges of a panel will be covered when the panels are affixed to one another.

3. The method as claimed in claim 1 wherein the back panel includes a piece of relatively stiff chipboard and a piece of upholstery that is initially larger than the chipboard, and the upholstery being wrapped around at least most of the chipboard edges in order that edges of a panel will be covered when the panels are affixed to one another.

4. The method as claimed in claim 1 wherein the front and back panels are affixed to one another along at least 50 percent of their edges by use of a sewing machine.

5. The method as claimed in claim 1 wherein the structural frame is captured by the front and back panels at least in part by a hook and loop fastener, and said fastener has a length that is at least 50 percent of the length of an unjoined edge of the front and back panels, and including the step of attaching the hooks of the hook and loop fastener to one of the two panels and attaching the loops of the hook and loop fastener to the other of the two panels, and the attachment of the hook and loop fastener to the panels occurring before the two panels are slid over the structural frame, whereby the hook and loop fastener will be attached to and carried by the front and back panels before the panels are used to repair a damaged sun visor.

6. The method as claimed in claim 5 wherein the combination of the front and back panels has a top and a bottom when they are assembled onto the structural frame, and wherein the hook and loop fastener is placed at the top of the combined panels, whereby the hook and loop fastener will be turned away from a vehicle's passenger when a repaired sun visor is rotated to a fully up position.

7. The method as claimed in claim 1 wherein the front panel is formed in part by affixing a piece of chipboard to a piece of upholstery with an adhesive.

8. The method as claimed in claim 1 wherein the back panel is formed in part by affixing a piece of chipboard to a piece of upholstery with an adhesive.

9. The method as claimed in claim 1 and including the additional step of removing the original upholstery from the structural frame before the front and back panels are slipped over the frame.

10. The method as claimed in claim 1 wherein the loose and unattached edges of the front and back panels are affixed to one another with a releasable fastening means, such that the fixation of the front and back panels to one another may be temporarily accomplished and later undone.

11. The method as claimed in claim 1 wherein the loose and unattached edges of the front and back panels are affixed to one another with a hook-and-loop fastener, such that the front and back panels may be repeatedly affixed to one another and then separated at will.

* * * * *